US010302507B2

United States Patent
Noguchi et al.

(10) Patent No.: US 10,302,507 B2
(45) Date of Patent: May 28, 2019

(54) TEMPERATURE SENSOR AND METHOD FOR MANUFACTURING THE SAME

(71) Applicant: NGK SPARK PLUG CO., LTD., Nagoya-shi, Aichi (JP)

(72) Inventors: Naoto Noguchi, Komaki (JP); Kota Shinohara, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 185 days.

(21) Appl. No.: 15/423,818

(22) Filed: Feb. 3, 2017

(65) Prior Publication Data

US 2017/0227406 A1   Aug. 10, 2017

(30) Foreign Application Priority Data

Feb. 5, 2016   (JP) .................................. 2016-020950

(51) Int. Cl.
| | |
|---|---|
| *G01K 7/22* | (2006.01) |
| *B23K 26/22* | (2006.01) |
| *G01K 1/08* | (2006.01) |
| G01K 7/16 | (2006.01) |
| B23K 101/38 | (2006.01) |

(52) U.S. Cl.
CPC ................ *G01K 7/22* (2013.01); *B23K 26/22* (2013.01); *G01K 1/08* (2013.01); *B23K 2101/38* (2018.08); *G01K 2007/163* (2013.01); *G01K 2205/04* (2013.01)

(58) Field of Classification Search
CPC ........ G01K 7/22; G01K 1/08; G01K 2205/04; G01K 2007/163; B23K 26/22; B23K 2101/38
USPC ................................. 374/208, 185, 183, 163
See application file for complete search history.

(56) References Cited

U.S. PATENT DOCUMENTS

| | | | | |
|---|---|---|---|---|
| 4,224,499 A | * | 9/1980 | Jones ...................... | B23K 28/02 |
| | | | | 219/121.85 |
| 7,121,722 B2 | * | 10/2006 | Hanzawa ............... | G01K 13/02 |
| | | | | 374/185 |
| 2009/0168842 A1 | | 7/2009 | Yokoi et al. | |
| 2018/0252595 A1 | * | 9/2018 | Sato ......................... | G01K 1/08 |

FOREIGN PATENT DOCUMENTS

| | | | |
|---|---|---|---|
| JP | 2009-175129 A | 8/2009 | |
| WO | WO 2012064003 A1 * | 5/2012 | ............ H01M 2/204 |

* cited by examiner

*Primary Examiner* — Natalie Huls
*Assistant Examiner* — Janice M Soto
(74) *Attorney, Agent, or Firm* — Sughrue Mion, PLLC

(57) ABSTRACT

A temperature sensor having a structure in which electrode wires are butted against signal wires with their weld portions and a method for manufacturing the temperature sensor. In a temperature sensor (1), outer circumferential portions (57a) and (57b) of each of weld portions (55) between electrode wires (25) and sheath core wires (3) are located outward of a first straight line D1 and a second straight line D2, respectively. A forward end-side length L1 is set to be longer than a rear end-side length L2. In addition, the sheath core wires (3) are larger in diameter than the electrode wires (25).

11 Claims, 15 Drawing Sheets

TEMPERATURE SENSOR AND METHOD FOR MANUFACTURING THE SAME

BACKGROUND OF THE INVENTION

1. Field of the Invention

The present invention relates to a temperature sensor including a temperature sensitive element having a temperature-sensitive portion such as a thermistor or a platinum resistor element, and to a method for manufacturing the temperature sensor.

The present invention is applicable to sensors used for measuring high temperatures under conditions in which vibrations are applied to the periphery of their temperature sensing portions, e.g., to vehicle-mounted temperature sensors and high-temperature sensors used for exhaust gas measurement in general-purpose stationary engines.

2. Description of the Related Art

One known conventional temperature sensor for detecting the temperature of exhaust gas from an automobile, etc., is described in Patent Document 1.

This temperature sensor includes: a thermistor element including a thermistor sintered body and platinum-made electrode wires; stainless steel-made sheath core wires serving as signal wires; a sheath member that holds the sheath core wires inside a sheath tube in an insulated condition; and a metal tube that contains the thermistor element and the sheath member. The electrode wires and the sheath core wires are joined together through weld portions formed by laser welding.

When this temperature sensor is produced, each of the electrode wires P1 made of, for example, platinum and a corresponding one of the sheath core wires P2 made of, for example, stainless steel are arranged parallel to each other such that their outer circumferences are in contact with each other as shown in FIG. 18, and the contact portions are joined together by laser welding. The sheath core wires P2 are slightly bent and offset from the axial center of the metal tube P4 so that the thermistor sintered body P3 is disposed at the axial center.

[Patent Document 1] Japanese Patent Application Laid-Open (kokai) No. 2009-175129

3. Problems to be Solved by the Invention

In the conventional technique described above, the electrode wires P1 and the sheath core wires P2 are made of different materials with different thermal expansion coefficients. Therefore, when the temperature sensor is used in an environment of large temperature changes, e.g., used for an automobile engine, the reliability of the weld portions (i.e., their joint strength, durability, etc.) may be compromised.

As described above, the electrode wires P1 and the sheath core wires P2 made of different materials are arranged parallel to each other and are welded together from their lateral side (the near side in FIG. 18). During a thermal cycle with a large temperature difference, a large force acts in an axial direction (the horizontal direction in FIG. 18), and this may cause a problem such as separation of the weld portions.

To address this problem, one might contemplate disposing each electrode wire P1 and a corresponding sheath core wire P2 so as to butt against each other and then welding the wires together. In this case, a narrow portion, for example, may be formed in the weld portion. At present, the reliability of such a weld portion has not been sufficiently examined.

SUMMARY OF THE INVENTION

The present invention has been made in view of the above problem, and an object thereof is to provide a temperature sensor having a structure in which electrode wires of a temperature sensitive element are butted against signal wires such as sheath core wires with their weld portions having improved reliability. Another object is to provide a method for manufacturing the temperature sensor.

The above object has been achieved, in a first aspect of the invention, by providing (1) a temperature sensor which comprises a temperature sensitive element including a temperature-sensitive portion disposed at a forward end portion, with respect to an axial direction, of the temperature sensitive element and a pair of electrode wires extending rearward from the temperature-sensitive portion, the temperature-sensitive portion having an electric characteristic that changes with temperature; and a pair of signal wires which are connected to rear end portions of the pair of electrode wires and to which an electric signal from the temperature sensitive element is transmitted, wherein each of the electrode wires and a corresponding one of the signal wires to which the electric signal is transmitted are disposed such that an axial line of each of the electrode wires is aligned with an axial line of the corresponding one of the signal wires, and a rear end portion, with respect the axial direction, of the each of the electrode wires and a forward end portion, with respect the axial direction, of the corresponding one of the signal wires face each other and are joined together.

In this temperature sensor, the electrode wires are made of a material different from a material of the signal wires, and the electrode wires are smaller in diameter than the signal wires. The temperature sensor further comprises weld portions each disposed between the rear end portion of one of the electrode wires and the forward end portion of a corresponding one of the signal wires, and the weld portions are formed by melting and mixing the material of the electrode wires and the material of the signal wires to thereby join the electrode wires and the signal wires together.

When the temperature sensor is viewed in a direction perpendicular to a plane in which the pair of electrode wires are disposed (in plan view), a forward end interface is present between a forward end portion of each of the weld portions and the rear end portion of a corresponding one of the electrode wires, and a rear end interface is present between a rear end portion of the each of the weld portions and the forward end portion of a corresponding one of the signal wires.

In plan view, each of the weld portions has a first radially outermost circumferential portion located on one side in the radial direction (i.e., the lateral direction) thereof and a second radially outermost circumferential portion located on the other side in the radial direction. The first radially outermost circumferential portion is located radially outward of a first straight line (virtual first straight line) connecting a first end of the forward end interface of the each of the weld portions and a first end of the rear end interface of the each of the weld portions, and the second radially outermost circumferential portion is located radially outward of a second straight line (virtual second straight line) connecting a second end of the forward end interface of the each of the weld portions and a second end of the rear end interface of the each of the weld portions.

In plan view, in each of the weld portions, a forward end-side length (e.g., L1), in the axial direction, from most radially outwardly protruding portions of the first and second radially outermost circumferential portions to the forward end interface is larger than a rear end-side length (e.g., L2), in the axial direction, from the most radially outwardly protruding portions to the rear end interface (i.e., L1>L2).

The temperature sensor (1) of the first aspect has the configuration described above. In this configuration, the electrode wires and the respective signal wires are butted against each other and welded together. However, the weld portions are less likely to have a problem such as narrowing, and the reliability of the weld portions (i.e., joint strength and durability) can be improved.

Specifically, in each of the weld portions between the electrode wires and the signal wires, the radially outermost circumferential portions are located outward (i.e., on the side away from the axial line) of the first and second straight lines, respectively, and the forward end-side length is set to be larger than the rear end-side length. Therefore, the degree of narrowing of each weld portion is smaller than that in, for example, a weld portion having a concave (narrowed) portion whose radially outermost circumferential portions are located on the inner side (the side toward the axial line) of the first and second straight lines. This gives the effect that the weld portions are less likely to break (e.g., having an increased tensile strength in the axial direction).

The signal wires are larger in diameter than the electrode wires, and the most radially outwardly protruding portions (i.e., the protruding portions having the largest distance to the axial line) of the weld portions are located closer to the large-diameter signal wires than the electrode wires. Therefore, the weld portions and the signal wires are firmly joined together.

In this temperature sensor, each electrode wire and a corresponding signal wire are disposed so as to butt against each other with their axial lines aligned with each other. Therefore, the temperature sensor can be manufactured without the need to bend the signal wires as in a conventional technique, so that the process for manufacturing the temperature sensor can be simplified.

Moreover, in the temperature sensor (1), the electrode wires and the signal wires need not be disposed so as to overlap each other over a prescribed length. This is advantageous in that, even when an expensive noble metal material such as platinum or a platinum alloy is used as the material of the electrode wires, the amount of the noble metal material used can be reduced.

In a preferred embodiment (2) of the temperature sensor according to (1) above, the entire first and second radially outermost circumferential portions of each of the weld portions are curved so as to be convex radially outward (i.e., convex outward with no inflection points).

In the temperature sensor (2), the weld portions can have a sufficient radial dimension (thickness). Thus even when an external tensile force is applied to the weld portions in the axial direction, the weld portions are less likely to break.

The radially outermost circumferential portions have the above-described shape in plan view. The radially outermost circumferential portions are preferably convex outward over their entire circumference.

In another preferred embodiment (3) of the temperature sensor according to (1) or (2) above, when the temperature sensor is viewed in the axial direction, the rear end portion of each of the electrode wires is included within the forward end portion of a corresponding one of the signal wires.

In the temperature sensor (3), each electrode wire and a corresponding signal wire are disposed such that their axial lines are aligned with each other or nearly aligned with each other. Therefore, the offset between the electrode wire and the signal wire is small, and a straight conductive wire is obtained. This configuration improves the ability to join the wires.

Since the offset between the axial lines is small, a sufficient gap can be ensured between the pair of conductive wires. Consequently, a short circuit is unlikely to occur between the conductive wires.

In a second aspect (4), the invention provides a method for manufacturing the temperature sensor according to any of (1) to (3) above, the method comprising butting the forward end surfaces of the signal wires and the rear end surfaces of the respective electrode wires against each other; and welding the signal wires and the respective electrode wires together.

By employing the manufacturing method (4), the signal wires and the electrode wires can be joined into straight conductive wires. In addition, the signal wires and the electrode wires can be joined together while in reliable contact with each other.

Since there is no need to bend the signal wires as in a conventional technique, the process for manufacturing the temperature sensor can be simplified, and the amount of the noble metal used can be reduced.

A preferred embodiment (5) of the temperature sensor manufacturing method according to (4) above comprises irradiating the signal wires with a laser beam to thereby laser-weld the signal wires and the respective electrode wires together.

In the manufacturing method (5), the signal wires having a larger diameter are irradiated with the laser beam. This can prevent narrowing of the weld portions and the electrode wires that occurs when the electrode wires having a smaller diameter are irradiated with the laser beam. Since the signal wires having a larger diameter are irradiated with the laser beam and melted first, the molten material of the signal wires is supplied to the electrode wires having a smaller diameter, and this causes the electrode wires to gradually melt. This allows the weld portions having the above described configuration to be easily formed.

In another preferred embodiment (6) of the temperature sensor manufacturing method according to (4) or (5) above, a material constituting the signal wires has a lower melting point than a material of the electrode wires, and the method comprises irradiating the signal wires having the lower melting point with a laser beam to thereby laser-weld the signal wires and the respective electrode wires together.

In the manufacturing method (6), irradiating with the laser beam causes the lower melting point signal wires to melt first. Therefore, voids are unlikely to be generated in the weld portions. The molten material of the signal wires is supplied to the higher-melting point electrode wires, and this causes the electrode wires to gradually melt. In this manner, the weld portions having the above described configuration can be easily formed.

Another preferred embodiment (7) of the temperature sensor manufacturing method according to any of (4) to (6) above comprises welding the signal wires and the respective electrode wires together while applying a load in a direction in which the signal wires and the respective electrode wires are butted against each other.

In the manufacturing method (7), when the signal wires and the electrode wires are welded together, for example, by laser welding, a load is applied in the direction in which the signal wires and the respective electrode wires are butted against each other. Therefore, even when the diameter of the signal wires is different from the diameter of the electrode wires, misalignment is less likely to occur. This manufacturing method has an advantage in that the shape of the weld portions in the first aspect (particularly, the shape of the weld portions in the second aspect) can be easily formed.

When cooled after joining, the signal wires, the weld portions and the electrode wires thermally shrink mainly in the axial direction. By applying a load in the same manner during the cooling, the degree of narrowing of the weld portions can be reduced, and the weld portions having the above-described preferred shape can be easily formed.

Preferably, in the present invention, the dimension between the protruding portions in plan view (the distance in a direction perpendicular to the axial line) is smaller than the axial length of the weld portions, and the dimension between the protruding portions is equal to or less than 150% of the diameter of the signal wires.

This is because, when the weld portions have a flange shape protruding significantly from the signal wires, breakage is likely to start from the interfacial portions between the weld portions and the electrode wires and between the weld portions and the signal lines.

The first and second ends of the forward end interface may not be in the same plane perpendicular to the axial direction, and the first and second ends of the rear end interface may not be in the same plane perpendicular to the axial direction. Moreover, the opposite most radially outwardly protruding portions may not be in the same plane perpendicular to the axial direction. In this case, average values in the axial direction can be used as their respective positions.

In the present invention, for example, a thermistor, a platinum resistor, etc., may be used as the temperature-sensitive portion of the temperature sensitive element.

Examples of the electrode wires include Pt wires, Pt—Rh alloy wires, Pt—Ir alloy wires, and wires made of a material prepared by adding a small amount of an alkaline-earth metal element (such as Sr) to a Pt and Pt—Rh alloy. Examples of the signal wires include wires made of stainless steel and wires made of INCONEL®.

DESCRIPTION OF REFERENCE NUMERALS

Figure 1:
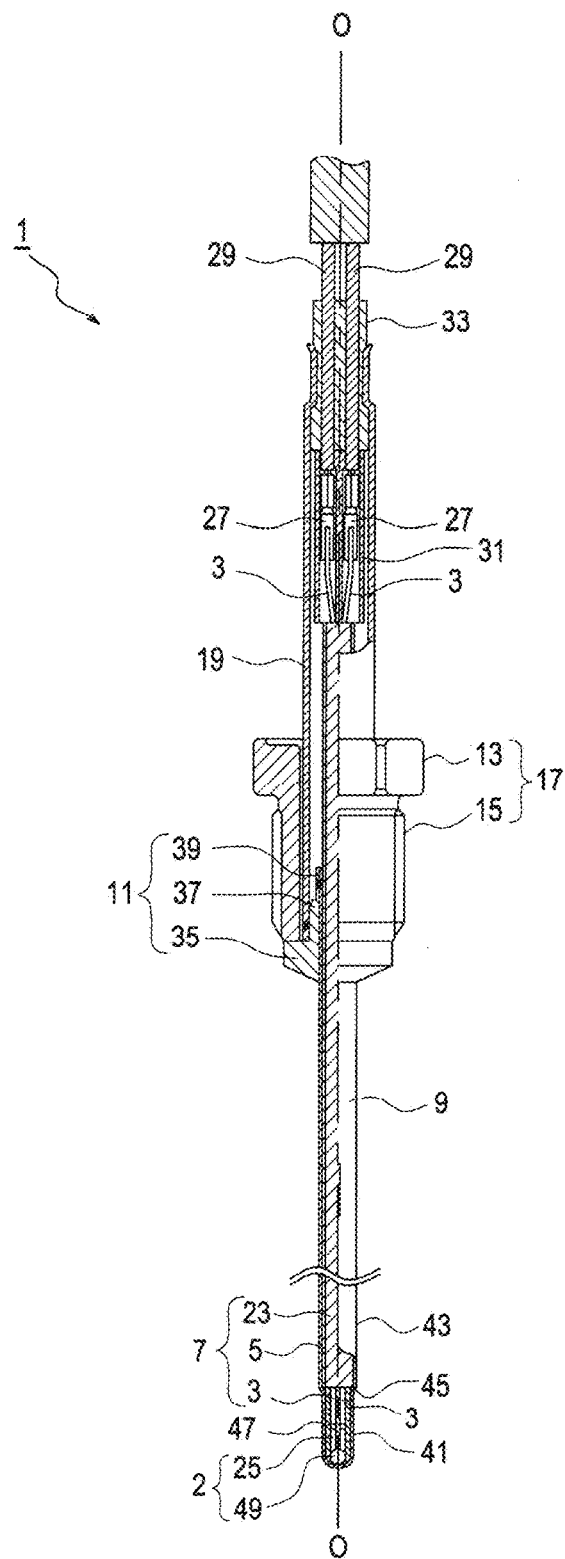
FIG. 1 is a cross-sectional view of a temperature sensor of a first embodiment cut in its axial direction.

Reference numerals used to identify various features in the drawings include the following.
1, 101, 151, 161: temperature sensor
2: thermistor element (temperature sensitive element)
3, 103, 155, 165: sheath core wire (signal wire)
25, 123, 153, 163: electrode wire
49: thermistor sintered body (temperature-sensitive portion)
55, 139, 157, 167: weld portion
57a, 57b, 141a, 141b: outer circumferential portion
63, 143: forward end interface
67, 145: rear end interface
71: rear end surface
73: forward end surface
102: resistor element (temperature sensitive element)
121: forward end temperature-sensitive portion (temperature-sensitive portion)
D1: first straight line
D2: second straight line
L1: forward end-side length
L2: rear end-side length
T, T1, T2: protruding portion
S: plane

DETAILED DESCRIPTION OF THE PREFERRED EMBODIMENTS

Embodiments of a temperature sensor to which the present invention is applied and a method for manufacturing the temperature sensor will be described with reference to the drawings. However, the present invention should not be construed as being limited thereto.

1. First Embodiment

1-1. Overall Structure of Temperature Sensor

As shown in FIG. 1, a temperature sensor 1 in a first embodiment includes: a thermistor element 2 serving as a temperature sensitive element; a sheath member 7 that holds a pair of metallic sheath core wires (signal wires) 3 inside a sheath tube 5 in an insulated condition; a cylindrical metal tube (housing) 9 having a closed forward end and extending in the direction of an axial line O; a mounting member 11 that supports the metal tube 9; a nut member 17 having a hexagonal nut portion 13 and a threaded portion 15; and an outer tube 19 fitted into a rear end portion of the mounting member 11.

The direction of the axial line O is the lengthwise direction of the temperature sensor 1 (the extending direction of the axial line O) and corresponds to the vertical direction in FIG. 1. The forward end side of the temperature sensor 1 is the lower side in FIG. 1, and the rear end side is the upper side in FIG. 1 (the same applies to other drawings presented herein).

In the temperature sensor 1, the thermistor element 2 for temperature measurement is contained in a forward end portion of the metal tube 9. The temperature sensor 1 is attached to, for example, a flow pipe such as an exhaust pipe of an internal combustion engine such that the forward end portion of the temperature sensor 1 is disposed inside the flow pipe through which a measurement target gas (exhaust gas) flows. The temperature sensor 1 thereby detects the temperature of the measurement target gas.

The components of the temperature sensor 1 will next be described in detail.

The sheath member 7 includes the sheath tube 5 made of a metal (e.g., a stainless steel alloy), the pair of sheath core wires 3 made of a conductive metal (e.g., a stainless steel alloy such as SUS310S), and an insulating powder 23 such as silica powder which holds the sheath core wires 3 such that the sheath tube 5 is electrically insulated from the pair of sheath core wires 3.

As described in detail below, the sheath core wires 3 are connected at their forward ends to electrode wires 25 extending rearward from the thermistor element 2, for example, by laser welding. The sheath core wires 3 are also connected at their rear ends to crimp terminals 27, for example, by resistance welding. In this manner, the sheath core wires 3 are connected at their rear ends to lead wires 29 for connection to an external circuit (e.g., an electronic control unit (ECU) of a vehicle) by the crimp terminals 27.

The pair of sheath core wires 3 are insulated from each other by an insulating tube 31, and the pair of crimp terminals 27 are also insulated from each other by the insulating tube 31. Each of the lead wires 29 includes a conductor covered with an insulating coating material and is disposed so as to extend through a heat resistant rubber-made auxiliary grommet 33.

The mounting member 11 includes a cylindrical protruding portion 35 protruding radially outward and a cylindrical rear sheath portion 37 extending rearward from the protruding portion 35. The rear sheath portion 37 includes a cylindrical sleeve 39 extending rearward, and the metal tube 9 is joined to the sleeve 39. Specifically, the mounting member 11 surrounds the outer circumferential surface of a rear end portion of the metal tube 9 to support the metal tube 9.

The metal tube 9 is made of a corrosion-resistant metal (for example, a stainless steel alloy such as SUS310S, which is also a heat resistant metal). The metal tube 9 is formed by deep-drawing a steel sheet into a tubular shape extending in the direction of the axial line O and having a closed forward end and an open rear end.

Figure 2:
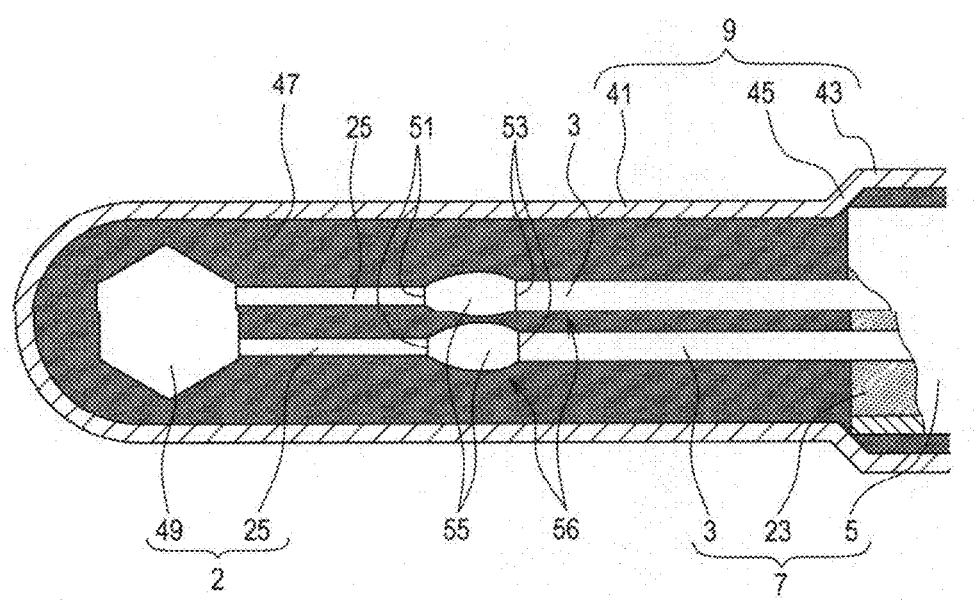
FIG. 2 is an enlarged plan view of a forward end portion of the temperature sensor cut in the axial direction.
Figure 3:
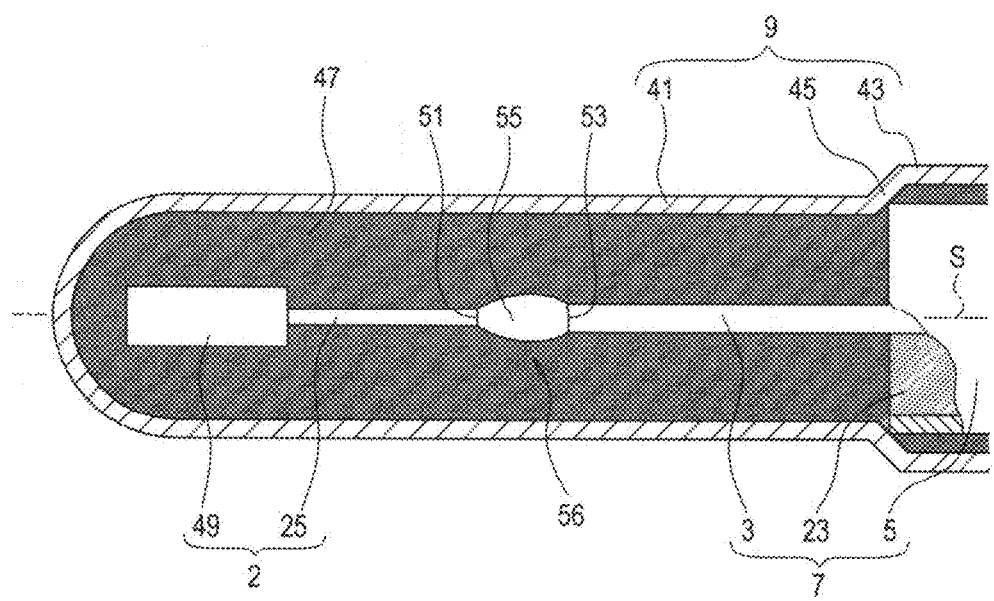
FIG. 3 is an enlarged front view of the forward end portion of the temperature sensor cut in the axial direction.

As shown in FIGS. 2 and 3 on an enlarged scale, the metal tube 9 has a forward small-diameter portion 41 having a small diameter, a rear large-diameter portion 43 having a diameter larger than the diameter of the small-diameter portion 41, and a step portion 45 disposed between the small-diameter portion 41 and the large-diameter portion 43.

The thermistor element 2 and cement 47 are contained in the metal tube 9, and the cement 47 filling the space around the thermistor element 2 prevents the thermistor element 2 from shaking. The cement 47 is made of an insulating material containing amorphous silica and alumina aggregate.

The thermistor element 2 includes a thermistor sintered body (temperature-sensitive portion) 49 having an electric characteristic (electrical resistance) that changes with temperature and a pair of electrode wires 25 for obtaining a change in the electric characteristic of the thermistor sintered body 49.

The thermistor sintered body 49 is a disk-shaped ceramic sintered body and is made of, for example, a perovskite oxide having a base composition of $(Sr, Y)(Al, Mn, Fe)O_3$. The electrode wires 25 are made of, for example, platinum (Pt).

1-2. Weld Portions Between Electrode Wires and Sheath Core Wires

Next, the structure of weld portions 55 between the electrode wires 25 and the sheath core wires 3 will be described.

As shown in FIGS. 2 and 3, in the first embodiment, one of the electrode wires 25 (the upper one in FIG. 2) is connected to one of the sheath core wires 3, and the other one of the electrode wires 25 (the lower one in FIG. 2) is connected to the other one of the sheath core wires 3. The pair of electrode wires 25 are disposed parallel to each other, and also the pair of sheath core wires 3 are disposed parallel to each other.

The pair of electrode wires 25 and the pair of sheath core wires 3 are disposed in the same plane S (see FIG. 3). The plane S extends parallel to the drawing sheet of FIG. 2 (i.e., the plane S is perpendicular to the drawing sheet of FIG. 3).

The electrode wires 25 and the sheath core wires 3 are made of different materials. Specifically, the electrode wires 25 are made of, for example, Pt, and the sheath core wires 3 are made of a material having a lower melting point than the material of the electrode wires 25, e.g., made of SUS310S.

The diameter (outer diameter) of the electrode wires 25 is, for example, □0.29 mm, and the diameter of the sheath core wires is, for example, ϕ0.47 mm. Specifically, the diameter of the electrode wires 25 is set to be smaller than the diameter of the sheath core wires 3.

Figure 4A:
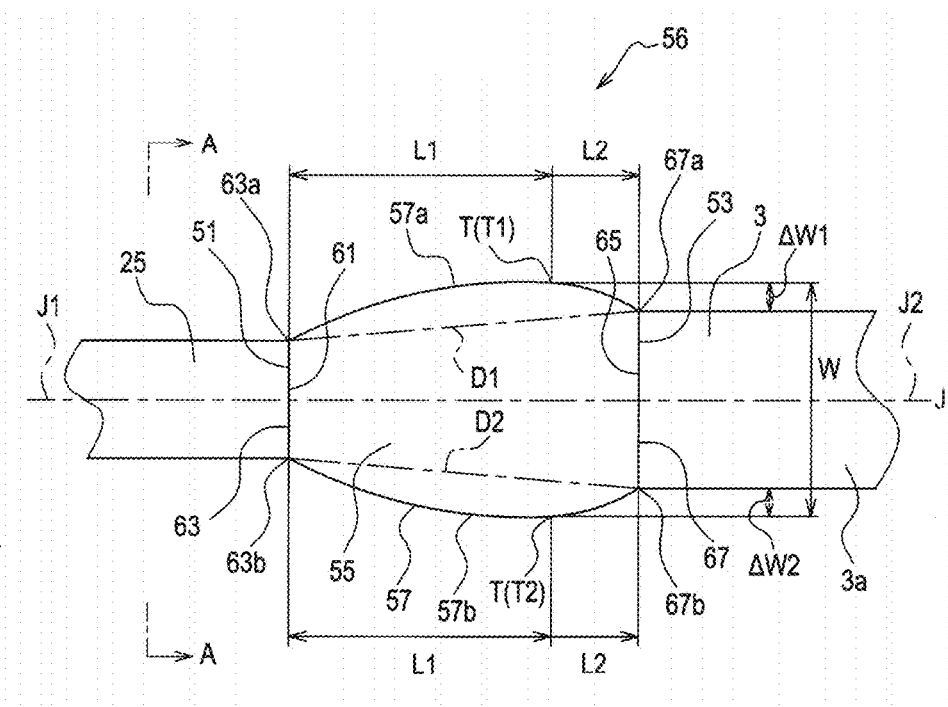
FIG. 4A is an enlarged plan view of a portion including a weld portion between an electrode wire and a sheath core wire.

As shown in FIG. 4A, each electrode wire 25 and a corresponding sheath core wire 3 are disposed such that an axial line J1 of the electrode wire 25 and an axial line J2 of the sheath core wire 3 are aligned with each other (i.e., the axial line J1 and the axial line J2 extend along the same axial line J). The electrode wire 25 and the sheath core wire 3 are welded together with a rear end portion 51, with respect to the direction of the axial line J1, of the electrode wire 25 facing a forward end portion 53, with respect to the direction of the axial line J2, of the sheath core wire 3. The axial line J is parallel to the axial line O.

More specifically, a weld portion 55 is formed between the rear end portion 51 of the electrode wire 25 and the forward end portion 53 of the sheath core wire 3. In the weld portion 55, the material of the electrode wire 25 and the material of the sheath core wire 3 are fused together to join the electrode wire 25 and the sheath core wire 3 together. The electrode wire 25 and the sheath core wire 3 are joined together through the weld portion 55 so as to form a single conductive wire 56.

The weld portion 55 is solid with no voids or a low number of voids (for example, a porosity of 30% or less).

Figure 4B:
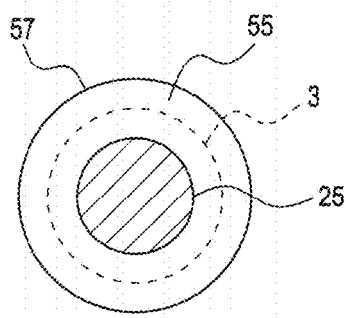
FIG. 4B is a cross-sectional view taken along A-A in FIG. 4A.
Figure 5:
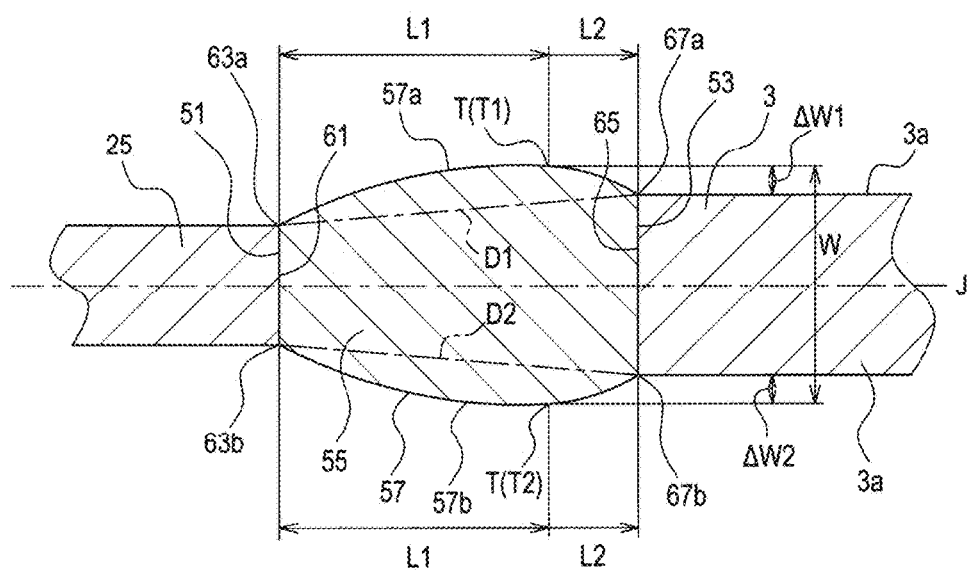
FIG. 5 is an enlarged plan view of a portion including the weld portion between the electrode wire and the sheath core wire, the weld portion being cut in the axial direction.

As shown in FIGS. 4A, 4B, and 5, the entire outer circumferential surface 57 of the weld portion 55 is curved so as to be convex radially outward. Specifically, the entire outer circumferential surface 57 has a shape bulging outward. When the outer circumferential surface 57 is cut in the direction of the axial line J (see FIG. 5), line segments corresponding to the outer circumferential surface 57 (outer circumferential portions 57a and 57b) are convex outward (toward the side away from the axial line J) with no inflection points.

When the weld portion 55 is viewed in the direction of the axial line J (see FIG. 4B), the entire rear end portion 51 of the electrode wire 25 with a smaller diameter is included within the forward end portion 53 of the sheath core wires 3 with a larger diameter.

In the first embodiment, when the weld portions 55 are viewed in a direction perpendicular to the plane S in which the pair of electrode wires 25 are disposed (see FIGS. 2 and 4A), each weld portion 55 has a forward end interface 63 that is the interface between the rear end portion 51 of a corresponding electrode wire 25 and a forward end portion 61 of the weld portion 55 and also has a rear end interface 67 that is the interface between the forward end portion 53 of a corresponding sheath core wire 3 and a rear end portion 65 of the weld portion 55.

The plane S includes base portions of the pair of electrode wires 25 (portions protruding from the thermistor sintered body 49) and is parallel to the axial line O.

The first outer circumferential portion 57a (the upper outer circumferential portion in FIG. 4A) of the weld portion 55, which is its outermost portion with respect to the radial direction of the weld portion 55 (the width direction (vertical direction) in FIG. 4A), is located radially outward of (above in FIG. 4A) a first straight line D1 connecting a first end portion 63a of the forward end interface 63 to a first end portion 67a of the rear end interface 67 (condition 1).

Similarly, the second outer circumferential portion 57b (the lower outer circumferential portion in FIG. 4A) of the weld portion 55, which is its outermost portion with respect to the radial direction, is located radially outward of (below in FIG. 4A) a second straight line D2 connecting a second end portion 63b of the forward end interface 63 to a second end portion 67b of the rear end interface 67 (condition 2).

The forward end interface 63 is formed into an annular shape on the outer circumference of the interface between the rear end portion 51 of the electrode wire 25 and the forward end portion 61 of the weld portion 55. The rear end interface 67 is formed into an annular shape on the outer circumference of the interface between the forward end portion 53 of the sheath core wire 3 and the rear end portion 65 of the weld portion 55.

In the first outer circumferential portion 57a (the upper outer circumferential portion in FIG. 4A) of the weld portion 55, a forward end-side length (L1), in the direction of the axial line J, from a first protruding portion T1 that is the most radially outward protruding portion (upward in FIG. 4A) to the first end portion 63a of the forward end interface 63 is greater than a rear end-side length (L2) from the first protruding portion T1 to the first end portion 67a of the rear end interface 67 (condition 3).

Similarly, in the second outer circumferential portion 57b (the lower outer circumferential portion in FIG. 4A) of the weld portion 55, a forward end-side length (L1), in the direction of the axial line J, from a second protruding portion T2 that is the most radially outward protruding portion (downward in FIG. 4A) to the second end portion 63b of the forward end interface 63 is greater than a rear end-side length (L2) from the second protruding portion T2 to the second end portion 67b of the rear end interface 67 (condition 4).

When the positions, in the direction of the axial line J, of the protruding portions T (T1, T2) are different from each other, the average of the positions of the protruding portions T1 and T2 is used as the position of the protruding portions T.

The distance W between the protruding portions T, i.e., the maximum diameter (width) of the weld portion 55 (e.g., 0.60 mm), is set to be smaller than the length of the weld portion 55 in the direction of the axial line J (e.g., 0.80 mm) (condition 5).

The distance W between the protruding portions T is equal to or less than 150% of the diameter of the sheath core wire 3 (condition 6). Each of the maximum protruding lengths $\Delta W$ ($\Delta W1$, $\Delta W2$) of the weld portion 55 that protrudes radially outward from an outer circumferential surface 3a of the sheath core wire 3 are 0.20 mm or less.

The configuration shown in FIG. 4A (for example, at least conditions 1 to 4 among conditions 1 to 6 described above) is the same when the conductive wire 56 is rotated about the axial line J. However, it is only necessary that conditions 1 to 6 described above (at least conditions 1 to 4) hold when the weld portion 55 is viewed in a direction perpendicular to the plane S in which the pair of electrode wires 25 are disposed.

1-3. Method for Manufacturing Temperature Sensor

Next, a method for manufacturing the temperature sensor 1 will be described.

In manufacturing the temperature sensor 1 in the first embodiment, preformed components such as the metal tube 9, the sheath member 7, the mounting member 11, and the thermistor element 2 are prepared using known methods.

Figure 6A:
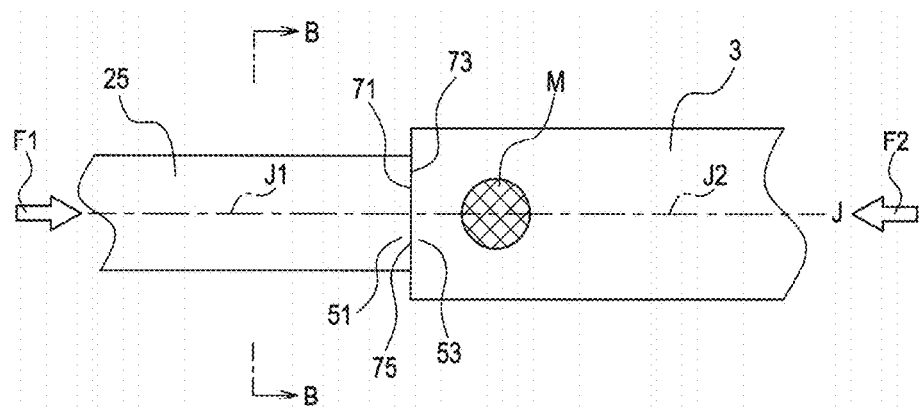
FIG. 6A is a front view of an electrode wire and a sheath core wire butted against each other when they are welded together.
Figure 6B:
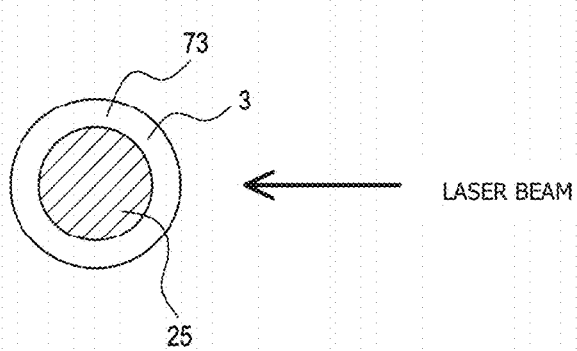
FIG. 6B is a cross-sectional view taken along B-B in FIG. 6A.

Then, as shown in FIGS. 6A and 6B, the end surface (rear end surface 71) of the rear end portion 51 of each of the pair of electrode wires 25 of the thermistor element 2 is butted against the end surface (forward end surface 73) of the forward end portion 53 of a corresponding one of the pair of sheath core wires 3, and the end surfaces are joined together by laser welding.

More specifically, the electrode wire 25 and the sheath core wire 3 are disposed such that the axial line J1 of the electrode wire 25 coincides with the axial line J2 of the sheath core wire 3 (i.e., the electrode wire 25 is coaxial with the sheath core wire 3), and the rear end surface 71 of the electrode wire 25 and the forward end surface 73 of the sheath core wire 3 are butted against each other. Then a prescribed load is applied to the contact portion (contact surface 75) from opposite sides in the direction of the axial line J (in the directions of arrows F1 and F2).

To apply the load, a spring (not shown), for example, is used to apply an external force to the thermistor element 2 and the sheath member 7 in the direction of the axial line J.

For example, the sheath member 7 is fixed by a jig (not shown) so as not to move, and the thermistor sintered body 49 is fixed by another jig (not shown) so as to be slidable only in the direction of the axial line O. Then the forward end (the left end in FIG. 6A) of the thermistor sintered body 49 is pressed by the spring. The range of the load applied may be 40.0 gf to 44.5 gf (corresponding to an applied force of 392.4 mN to 436.545 mN).

Then, as shown in FIG. 6B, while the load is applied, a laser beam is directed toward the electrode wire 25 and the sheath core wire 3 from the lateral direction (i.e., from a direction perpendicular to the direction of the axial line J and extending along the plane S) to thereby perform laser welding.

The position irradiated with the laser beam is located a prescribed distance (e.g., 0.05 mm to 0.25 mm) rearward (rightward in FIG. 6A) of the forward end surface 73 of the sheath core wire 3. The laser beam is directed such that the contact surface 75 at which the rear end surface 71 of the electrode wire 25 and the forward end surface 73 of the sheath core wire 3 abut against each other is not irradiated with the laser beam.

The conditions of the laser welding are, for example, as follows.

Type of the laser: YAG laser
Welding spot diameter: 0.53 mm
Pulse width: 10 ms
Power at processing point: about 3.8 J As a result of the laser irradiation, the portion irradiated with the laser beam (a meshed portion M in FIG. 6A) is melted, and this causes the forward end portion of the sheath core wire 3 and the rear end portion of the electrode wire 25 to gradually fuse. Then the laser irradiation is stopped, and the fused portion is solidified. The weld portion 55 shown in FIG. 4A, etc., is thereby formed.

The manufacturing process following the laser welding is the same as a conventional manufacturing process and will be described briefly.

For example, as shown in FIG. 1, the metal tube 9 is press-fitted into the mounting member 11 and welded to the sleeve 39, and the metal tube 9 is thereby integrated with the mounting member 11.

Next, a forward end component 81 (see FIG. 7) including the sheath member 7 with the thermistor element 2 welded thereto and the metal tube 9 with the mounting member 11 welded thereto is assembled.

Figure 7:
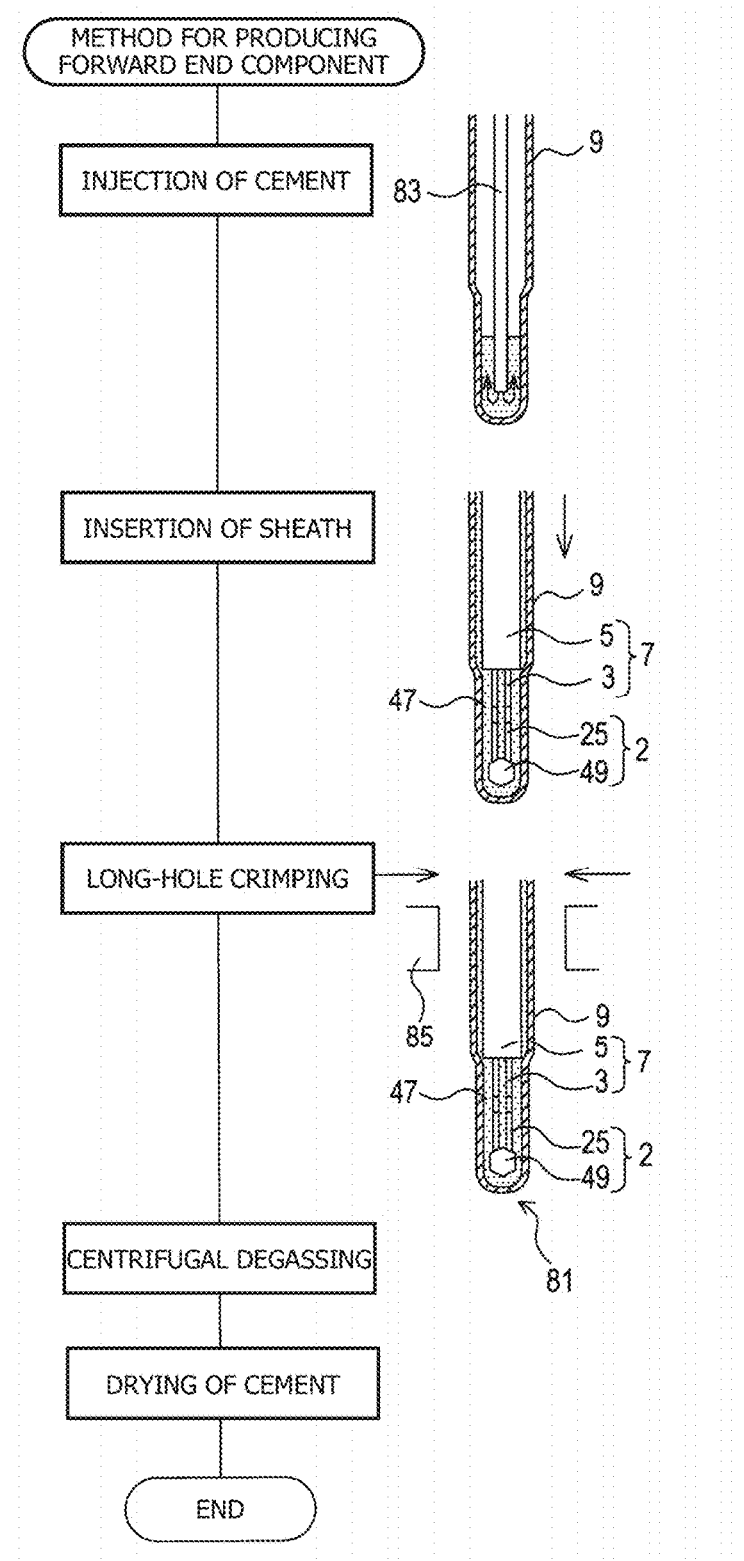
FIG. 7 illustrates a process for manufacturing the temperature sensor.

This process will be described using FIG. 7.

To produce the forward end component 81, before the thermistor element 2 is inserted into the metal tube 9 with the mounting member 11 welded thereto, a nozzle 83 is inserted into the forward end portion of the metal tube 9, and the cement 47 in paste form is injected into the metal tube 9.

Next, the sheath member 7 with the thermistor element 2 welded thereto is inserted into the metal tube 9 with the cement 47 injected thereinto.

With the sheath member 7 inserted into the metal tube 9, long-hole crimping is performed. Specifically, dies 85 opposed to each other are pressed against the metal tube 9 from its radially outer side. As a result of the long-hole crimping, the metal tube 9 and the sheath member 7 are finally positioned and fixed.

The forward end component 81 is completed in the manner described above. Then the forward end component 81 is subjected to well-known centrifugal degassing. After completing the centrifugal degassing, the forward end component 81 is heat-treated to dry (cure) the cement 47.

The heat-treated forward end component 81 is obtained in the manner described above.

The process of assembling the forward end component 81 and other components is the same as a conventionally used process, and its description will be omitted.

1-4. Effects (1) In the temperature sensor 1 in the first embodiment, the electrode wires 25 and the sheath core wires 3 are made of different materials, and the electrode wires 25 are smaller in diameter than the sheath core wires 3. The weld portion 55 is present between the rear end portion 51 of each electrode wire 25 and the forward end portion 53 of a corresponding sheath core wire 3. In the weld portion 55, the material of the electrode wire 25 and the material of the sheath core wire 3 are fused together to thereby join the electrode wire 25 and the sheath core wire 3.

When each weld portion 55 is viewed in a direction perpendicular to the plane S in which the pair of electrode wires 25 are disposed (in plan view), the forward end interface 63 is present between the rear end portion 51 of the electrode wire 25 and the forward end portion 61 of the weld portion 55, and the rear end interface 67 is present between the forward end portion 53 of the sheath core wire 3 and the rear end portion 65 of the weld portion 55.

In plan view, the first and second radially outermost circumferential portions 57a and 57b of the weld portion 55 are located radially outward of the first straight line D1 and the second straight line D2, respectively.

Moreover, in the first and second outer circumferential portions 57a and 57b of the weld portion 55, the forward end-side length L1, in the direction of the axial line J, from the most radially outwardly protruding portions T1 and T2 to the forward end interface 63 is larger than the rear end-side length L2, in the direction of the axial line J, from the protruding portions T1 and T2 to the rear end interface 67.

Since this temperature sensor 1 has the structure described above (a structure that meets conditions 1 to 6), the weld portions 55 produced by welding together the electrode wires 25 and the sheath core wires 3 butted against each other are not narrowed (or are less narrowed) and have no voids (or less voids). Consequently, the reliability (i.e., joint strength and durability) of the weld portions 55 is improved.

Specifically, the weld portions 55 between the electrode wires 25 and the sheath core wires 3 have less voids. The outer circumferential portions 57a and 57b of each weld portion 55 are located outward of the first straight line D1 and the second straight line D2, respectively, and the forward end-side length L1 is set to be larger than the rear end-side length L2. This gives the effect that the weld portions 55 are less likely to break than, for example, a weld portion having a concave (narrowed) portion whose outer circumferential portions 57a and 57b are located on the inner side of the first straight line D1 and the second straight line D2, respectively.

The sheath core wires 3 are larger in diameter than the electrode wires 25, and the protruding portions T of the weld portions 55 that have the largest diameter are located closer to the large-diameter sheath core wires 3 than the electrode wires 25. Therefore, the weld portions 55 and the sheath core wires 3 are firmly joined together.

In the temperature sensor 1, the axial line J1 of each electrode wire 25 is aligned with the axial line J2 of a corresponding sheath core wire 3, and the electrode wire 25 and the sheath core wire 3 are disposed so as to butt against each other. Therefore, the temperature sensor 1 can be manufactured without having to bend the sheath core wires 3 as in a conventional technique. As a result, the process for manufacturing the temperature sensor 1 can be simplified.

Moreover, in the temperature sensor 1, the electrode wires 25 and the sheath core wires 3 need not be disposed so as to overlap each other with a prescribed overlapping length. This is advantageous in that, even when an expensive noble metal material is used as the material of the electrode wires 25, the amount of the noble metal material used can be reduced.

(2) In the temperature sensor 1, the entire outer circumferential portions 57a and 57b of each of the weld portions 55 are curved so as to be convex radially outward (i.e., convex outward with no inflection points).

Therefore, the weld portions 55 can have a sufficient radial dimension (width: i.e., a sufficient thickness over the entire circumference). Thus, even when the weld portions 55 receive an external tensile force in the axial direction, the weld portions 55 are less likely to break.

(3) When the temperature sensor 1 is viewed in its axial direction, the rear end portion 51 of each electrode wire 25 is included within the range of the forward end portion 53 of a corresponding sheath core wire 3.

Specifically, each electrode wire 25 and a corresponding sheath core wire 3 are disposed such that the axial line J1 of the electrode wire 25 is aligned with the axial line J2 of the sheath core wire 3. Therefore, the offset between the electrode wire 25 and the sheath core wire 3 is small, and a straight conductive wire 56 can be obtained. Thus, the ability to join the wires is improved. Moreover, a sufficient gap can be ensured between the pair of conductive wires 56. As a result, a short circuit is unlikely to occur between the conductive wires 56.

(4) In the temperature sensor 1, the protruding lengths ΔW of the protruding portions T of each of the weld portions 55 are small. Consequently, a short circuit is unlikely to occur between the pair of conductive wires 56. In addition, it is advantageous in that the forward end portion of the metal tube 9 can be easily filled with the cement 47 during manufacturing.

(5) In the method for manufacturing the temperature sensor 1 in the first embodiment, the forward end surfaces 73 of the sheath core wires 3 are butted against the rear end surfaces 71 of the electrode wires 25, and then the sheath core wires 3 and the electrode wires 25 are welded together.

Therefore, the sheath core wires 3 and the electrode wires 25 can be formed into straight conductive wires 56. Moreover, the sheath core wires 3 and the electrode wires 25 can be joined together after being brought into reliable contact with each other.

Since there is no need to bend the sheath core wires 3 as in a conventional technique, the process for manufacturing the temperature sensor 1 can be simplified.

(6) In the method for manufacturing the temperature sensor 1, the large-diameter sheath core wires 3 with a lower melting point are irradiated with a laser beam to thereby laser-weld the electrode wires 25 and the sheath core wires 3 together.

Specifically, since the large-diameter sheath core wires 3 are melted first by irradiation with the laser beam, the weld portions 55 are less narrowed. Since the sheath core wires 3 with a lower melting point are melted first, voids are less likely to be formed in the weld portions 55. The molten material of the sheath core wires 3 is supplied to the small-diameter electrode wires 25 with a higher melting point, and the electrode wires 25 are thereby fused gradually. This allows the weld portions 55 having the preferable shape described above to be easily formed.

(7) In the method for manufacturing the temperature sensor 1, while a load is applied in the direction in which the sheath core wires 3 and the electrode wires 25 are butted against each other, the sheath core wires 3 and the electrode wires 25 are welded together.

Therefore, the sheath core wires 3 and the electrode wires 25 are less likely to be misaligned during welding. Moreover, it is advantageous in that the weld portions 55 having the preferable shape described above can be easily formed.

1-5. Corresponding Structure

Structure corresponding to various terms used to define the invention are given below.

The thermistor sintered body 49, the electrode wires 25, the thermistor element 2, the sheath core wires 3, the temperature sensor, the plane S, the weld portions 55, the forward end interface 63, the rear end interface 67, the outer circumferential portions 57a and 57b, the first straight line D1, the second straight line D2, the protruding portions T, T1, T2, the forward end-side length L1, the rear end-side length L2, the forward end surface 73, and the rear end surface 71 correspond to examples of the temperature-sensitive portion, the electrode wires, the temperature sensitive element, the signal wires, the temperature sensor, the plane, the weld portions, the forward end interface, the rear end interface, the radially outermost circumferential portions, the first straight line, the second straight line, the most radially outwardly protruding portions, the forward end-side length, the rear end-side length, the forward end surface, and the rear end surface, respectively, of the invention.

2. Second Embodiment

Next, a second embodiment will be described. However, the description of the same components as those in the first embodiment will be omitted.

2-1. Overall Structure of Temperature Sensor

Figure 8:
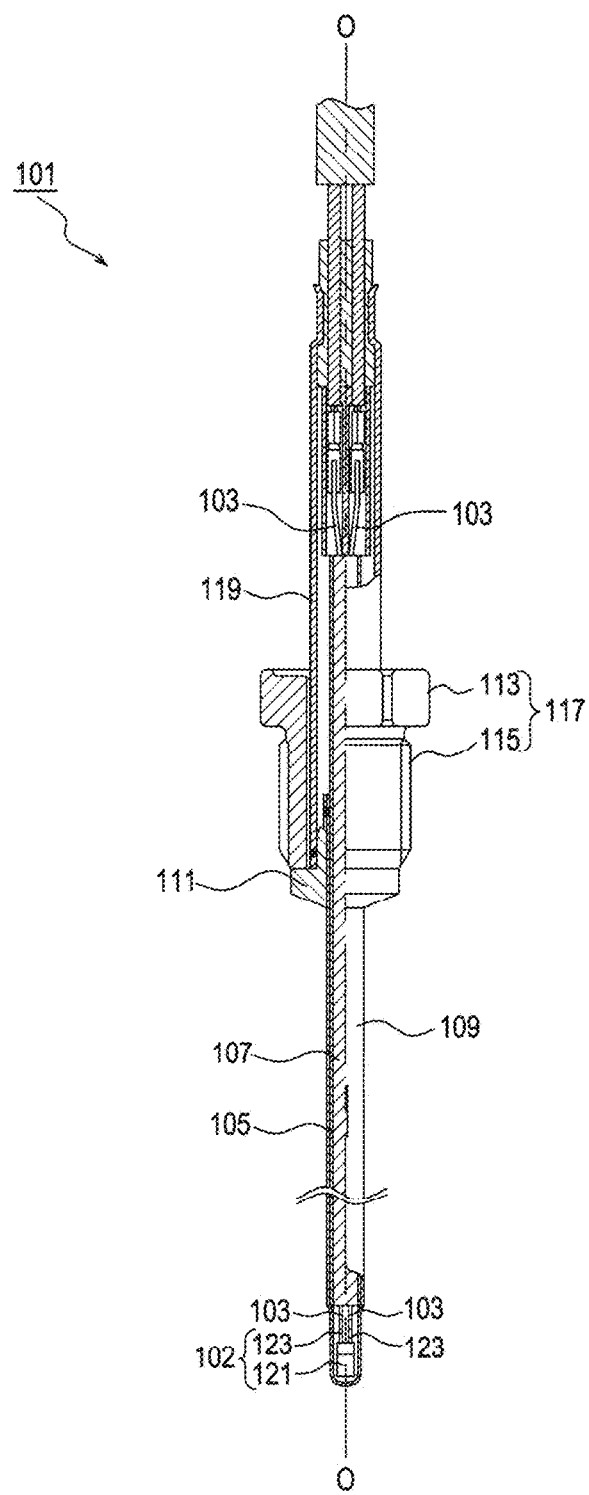
FIG. 8 is a cross-sectional view of a temperature sensor of a second embodiment cut in its axial direction.

As shown in FIG. 8, a temperature sensor 101 in the second embodiment includes: a resistor element 102 serving as a temperature sensitive element for temperature measurement; a sheath member 107 that holds a pair of metallic sheath core wires (signal wires) 103 inside a sheath tube 105 in an insulated condition; a cylindrical metal tube 109 having a closed forward end and extending in the direction of an axial line O; a mounting member 111 that supports the metal tube 109; a nut member 117 having a hexagonal nut portion 113 and a threaded portion 115; an outer tube 119 fitted into a rear end portion of the mounting member 111; and other components.

The components other than the resistor element 102 are the same as those in the first embodiment, and their description will be omitted.

2-2. Resistor Element

Figure 9:
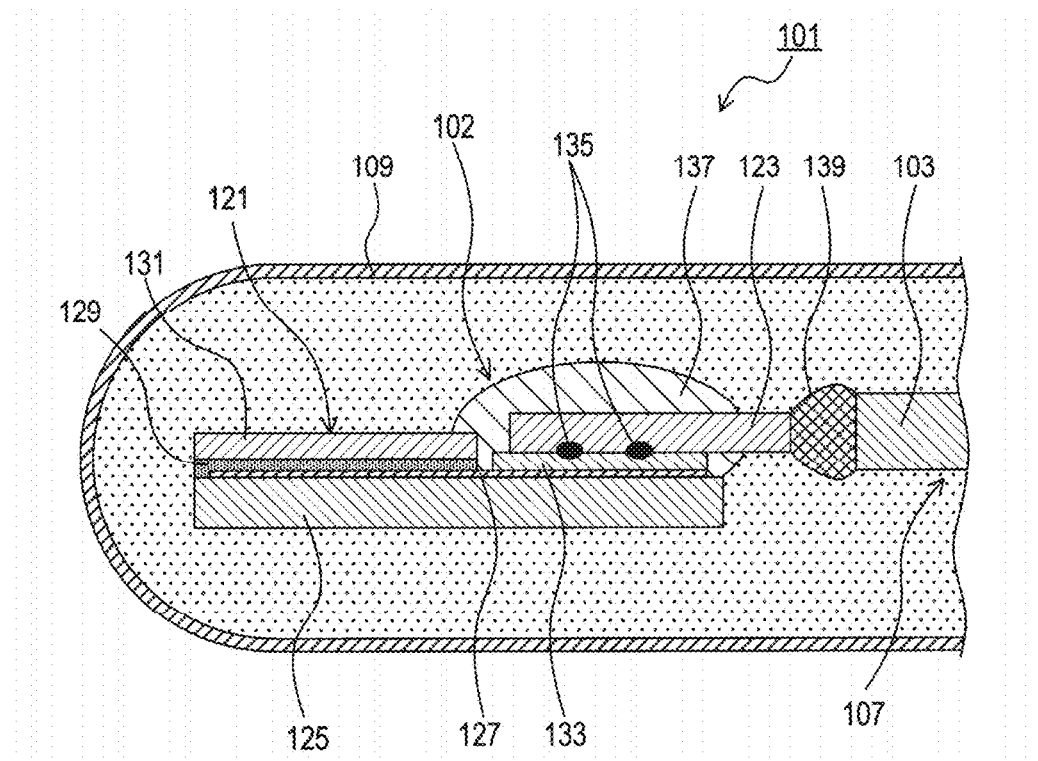
FIG. 9 is an enlarged front view of a forward end portion of the temperature sensor cut in the axial direction.

As shown in FIG. 9, the resistor element 102 includes a forward end temperature-sensitive portion 121 having an electric characteristic that changes with temperature and a pair of electrode wires 123 connected to the forward end temperature-sensitive portion 121.

The forward end temperature-sensitive portion 121 includes a ceramic base 125, a metallic resistor 127, a junction layer 129, a ceramic coating layer 131, and electrode pads 133. See FIG. 9.

The ceramic base 125 is made of alumina and is a fired sheet prepared by firing a ceramic green sheet in advance.

The metallic resistor 127 is a resistance thermometer composed mainly of platinum (Pt) and having an electric characteristic (electric resistance) that changes with temperature. The metallic resistor 127 is formed into a prescribed pattern shape on the surface of the ceramic base 125.

The ceramic coating layer 131 is made of alumina and is a fired sheet prepared by firing a ceramic green sheet in advance. The ceramic coating layer 131 is disposed on a surface of the metallic resistor 127 that is opposite its surface in contact with the ceramic base 125 and covers a forward end portion of the metallic resistor 127.

The junction layer 129 is made of alumina. Before joining, the junction layer 129 is in the form of a paste containing alumina powder. After the fired ceramic base 125 and the ceramic coating layer 131 are laminated via the paste, and the laminate is subjected to heat treatment. The paste thereby becomes the junction layer 129.

The pair of electrode wires 123 are electrically connected to a rear end portion (the right portion in FIG. 9) of the metallic resistor 127 by the electrode pads 133 that are formed so as to have a larger width than the conductor pattern covered with the ceramic coating layer 131.

The electrode pads 133 and the pair of electrode wires 123 are joined together by welding such as resistance welding or laser welding at welding points 135.

The joint portions between the electrode pads 133 and the pair of electrode wires 123 are covered with a covering member 137. The covering member 137 is made of a glass material composed mainly of aluminosilicate glass.

The pair of electrode wires 123 are disposed so as to extend from the rear end of the metallic resistor 127 toward the sheath member 107 (the rear end side).

The pair of electrode wires 123 are disposed such that their rear ends butt against the forward ends of the pair of sheath core wires 103, as in the first embodiment. More specifically, the rear ends of the pair of electrode wires 123 and the forward ends of the pair of sheath core wires 103 are joined together by weld portions 139 formed by laser welding.

The structure of the electrode wires 123, the sheath core wires 103, the weld portions 139 described above is the same as that described in the first embodiment (i.e., meets conditions 1 to 6).

Figure 10:
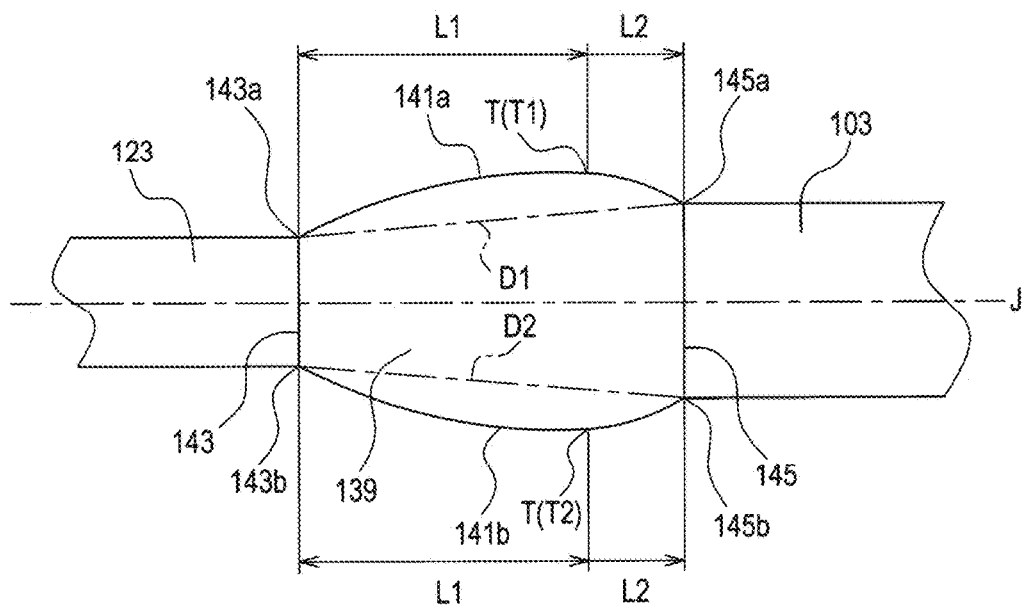
FIG. 10 is an enlarged plan view of a portion including a weld portion between an electrode wire and a sheath core wire.

Specifically, as shown in FIG. 10, when each of the weld portions 139 is viewed in a direction perpendicular to a plane S (a plane extending along the drawing sheet of FIG. 10) in which the pair of electrode wires 123 are disposed (i.e., from above in FIG. 9), a first radially outermost circumferential portion 141a of the weld portion 139 is located radially outward of (above in FIG. 10) a first straight line D1 connecting a first end 143a of a forward end interface 143 and a first end 145a of a rear end interface 145.

Similarly, a second radially outermost circumferential portion 141b of the weld portion 139 is located radially outward of (below in FIG. 10) a second straight line D2 connecting a second end 143b of the forward end interface 143 and a second end 145b of the rear end interface 145.

In addition, in the first radially outermost circumferential portion 141a of the weld portion 139, a forward end-side length L1, in the direction of the axial line J, from a first protruding portion T1 that is the most radially outward protruding portion to the first end 143a of the forward end interface 143 is greater than a rear end-side length L2 from the first protruding portion T1 to the first end 145a of the rear end interface 145.

Similarly, in the second radially outermost circumferential portion 141b of the weld portion 139, a forward end-side length L1, in the direction of the axial line J, from a second protruding portion T2 that is the most radially outward protruding portion to the second end 143b of the forward end interface 143 is greater than a rear end-side length L2 from the second protruding portion T2 to the second end portion 145b of the rear end interface 145.

The structure of the second embodiment described above has the same effects as those of the first embodiment.

3. Other Embodiments

Next, other embodiments will be described. However, the description of the same components as those in the first embodiment will be omitted.

Figure 11A:
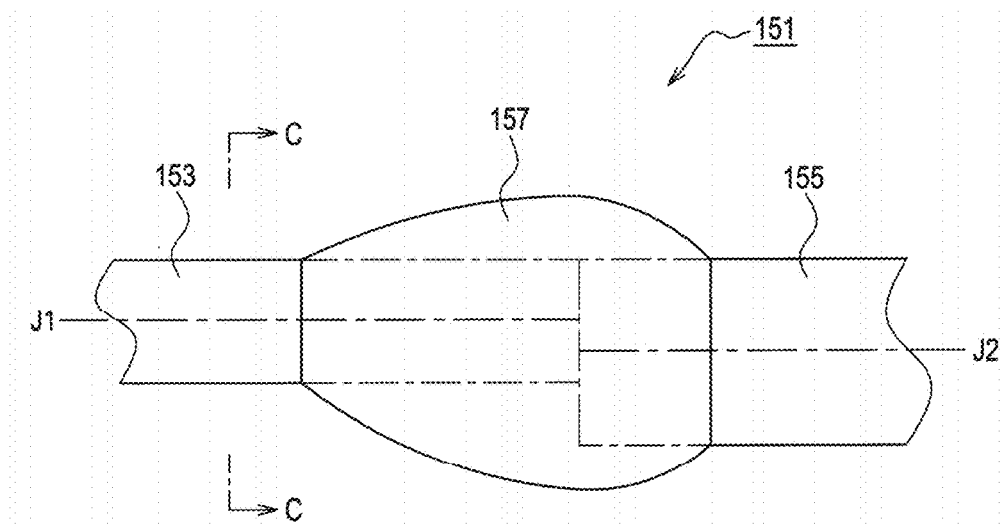
FIG. 11A is an enlarged plan view of a portion including a weld portion between an electrode wire and a sheath core wire in a third embodiment.
Figure 11B:
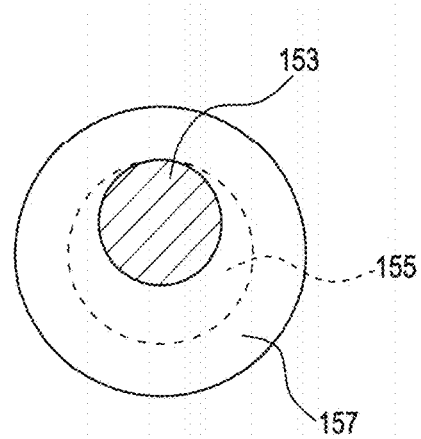
FIG. 11B is a cross-sectional view taken along C-C in FIG. 11A.

As shown in FIGS. 11A and 11B, in a temperature sensor 151 in a third embodiment, electrode wires 153 and sheath core wires 155 are not disposed coaxially with each other. The axial line J1 of each electrode wire 153 is offset from the axial line J2 of a corresponding sheath core wire 155.

Also in the third embodiment, as in the first embodiment, the electrode wires 153 and the sheath core wires 155 are joined by weld portions 157.

Therefore, the same effects as those in the first embodiment are obtained.

Figure 12:
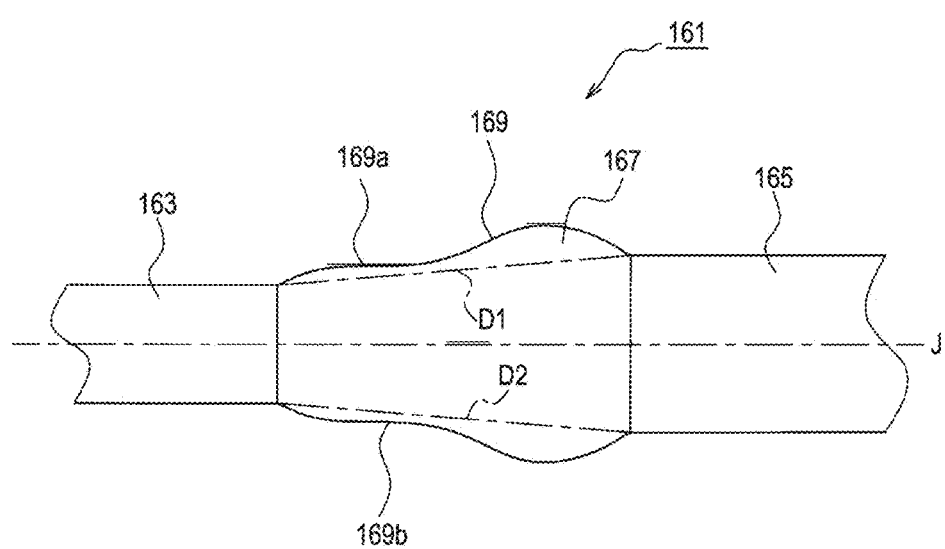
FIG. 12 is an enlarged plan view of a portion including a weld portion between an electrode wire and a sheath core wire in a fourth embodiment.

As shown in FIG. 12, in a temperature sensor 161 in a fourth embodiment, electrode wires 163 and sheath core wires 165 are disposed coaxially with each other and joined together through weld portions 167, as in the first embodiment.

The outer shape of the weld portions 167 is different from that in the first embodiment, and part of the outer circumferential surface 169 of each weld portion 167 is dented toward the axial line J.

Specifically, when each weld portion 167 is viewed in a direction perpendicular to a plane in which the pair of electrode wires 163 are disposed, first and second outer circumferential portions 169a and 169b of the outer circumferential surface 169 of the weld portion 167 are located radially outward (outward with respect to the axial line J) of the first straight line D1 and the second straight line D2, respectively, as in the first embodiment. However, the outer circumferential portions 169a and 169b are partially dented toward the axial line J so as to have inflection points.

Also in the fourth embodiment, the same effects as those in the first embodiment are obtained.

4. Experimental Examples

A description will next be given of Experimental Examples performed to examine the effects of the present invention.

4-1. Experimental Example 1 a) In Experimental Example 1, part of a temperature sensor of Sample No. 1 serving as an inventive Example was produced by the same manufacturing method as that in the first embodiment. Specifically, a test member was produced by laser-welding the thermistor element and sheath member of the temperature sensor.

The conditions of the laser welding for Sample No. 1 are the conditions exemplified in the first embodiment. The rear end surfaces of the electrode wires were butted against the forward end surfaces of the sheath core wires, and then a load of 42.0 gf (corresponding to an applied force of 412.02 mN) was applied to the contact portions from opposite axial ends. The positions irradiated with the laser beam were located 0.15 mm rearward (in the direction away from the electrode wires) of the forward end surfaces of the sheath core wires. Other manufacturing conditions were the same as those in the first embodiment (the same applies to the following).

Figure 13:
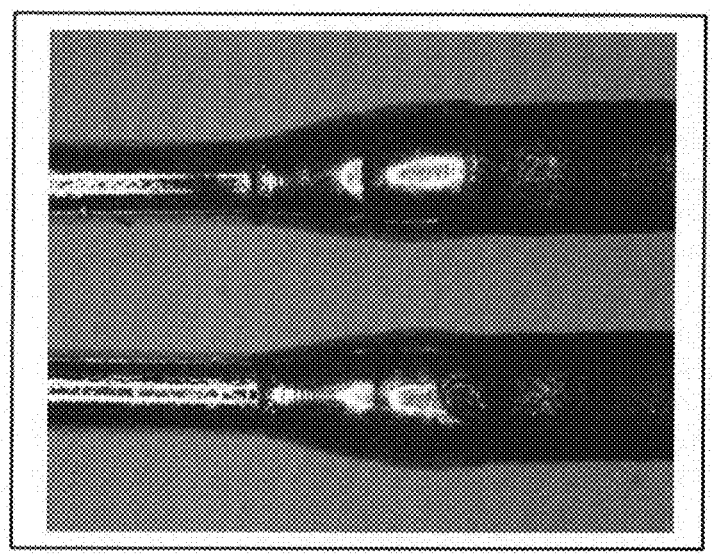
FIG. 13 is a magnified photograph of a portion including weld portions between electrode wires and sheath core wires of Sample No. 1 in Experimental Example 1.

Then the vicinity of the weld portions between the electrode wires and the sheath core wires joined together was observed, and a photograph of the observed region was taken. FIG. 13 shows a photograph of the vicinity of the weld portions of the pair of conductive wires in Sample No. 1. The photograph was taken at a magnification of 150× in a direction perpendicular to the plane S.

The dimensions of parts of the test member of Sample No. 1 were measured. As is clear from FIG. 13, the temperature sensor (test member) manufactured by the same manufacturing method as that in the first embodiment met conditions 1 to 4 described above.

Specifically, L1 of the weld portion of one (upper one) of the conductive wires in sample No. 1 was 0.51 mm, and L2 was 0.29 mm. L1 of the weld portion of the other one (lower one) of the conductive wires was 0.57 mm, and L2 was 0.24 mm.

b) In Experimental Example 1, test members of temperature sensors of Samples Nos. 2 and 3 were also produced as Comparative Examples.

In Sample No. 2, the rear end surfaces of the electrode wires were butted against the forward end surfaces of the sheath core wires. Then, in contrast to Sample No. 1, the load applied to the contact portions from the opposite axial ends was changed to 45.0 gf (corresponding to an applied force of 441.45 mN), and laser welding was performed.

In contrast to Sample No. 1, in Sample No. 3, the positions irradiated with the laser beam were changed to positions located 0.20 mm frontward of the forward end surfaces of the sheath core wires (i.e., positions within the electrode wires).

Figure 14A:
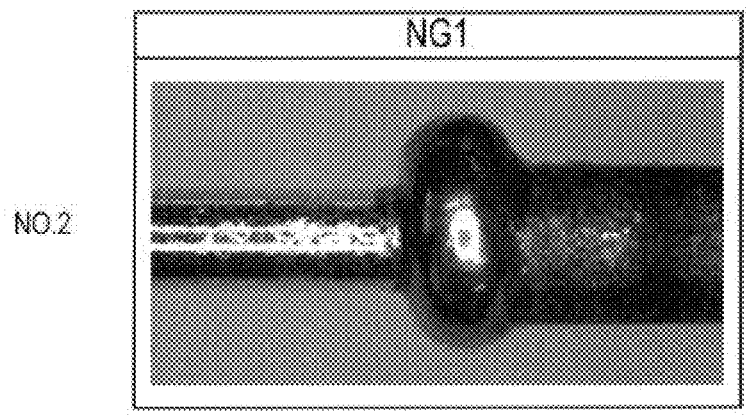
FIG. 14A is an enlarged photograph of a portion including a weld portion between an electrode wire and a sheath core wire of Sample No. 2 in Experimental Example 1.
Figure 14B:
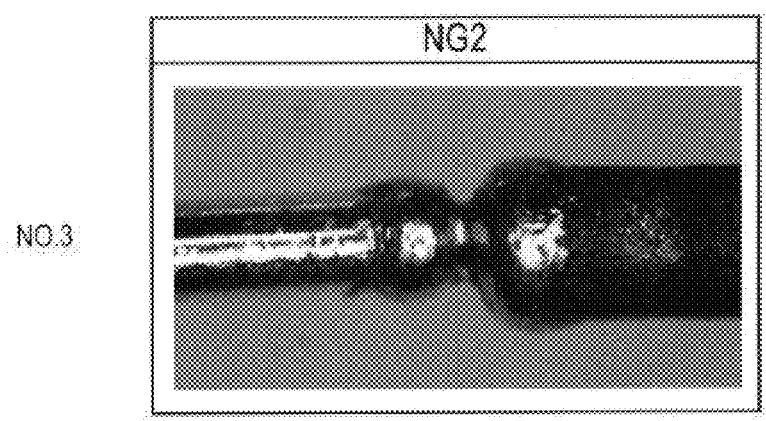
FIG. 14B is an enlarged photograph of a portion including a weld portion between an electrode wire and a sheath core wire of Sample No. 3 in Experimental Example 1.

The vicinities of the weld portions between the electrode wires and sheath core wires joined together were observed, and photographs of the observed regions were taken. FIGS. 14A and 14B are photographs each showing the vicinity of the weld portion of one of the pair of conductive wires in Sample No. 2 or 3. The photographs were taken at a magnification of 150× in a direction perpendicular to the plane S.

The dimensions of parts of the test members of samples Nos. 2 and 3 were measured. As is clear from FIGS. 14A and 14B, the test members in the Comparative Examples did not meet any of the above-described conditions 1 to 4.

For example, Sample No. 2 (NG1) did not meet conditions 3 and 4. In addition, the weld portions significantly bulged radially outward (conditions 5 and 6 were not satisfied). In Sample No. 3 (NG2), the weld portions were significantly narrowed, and conditions 1 and 2 were not met.

4-2. Experimental Example 2

In Experimental Example 2, the position irradiated with the laser beam was changed to examine the state of the weld portions thus formed.

Figure 15:
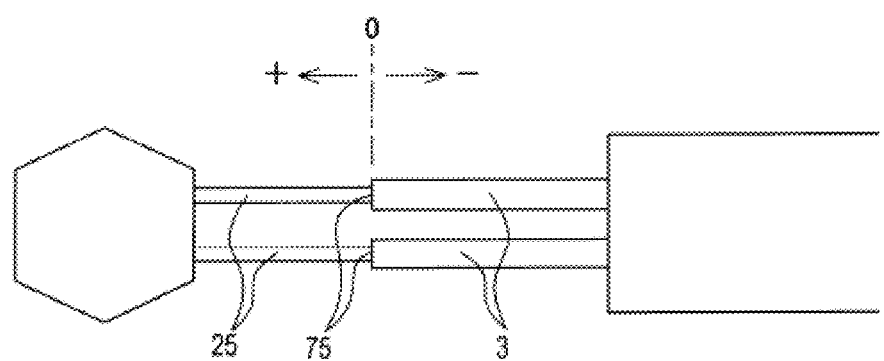
FIG. 15 is an illustration of the position of laser welding in Experimental Example 2.

Specifically, as shown in FIG. 15, the position (contact portion (75)) at which the electrode wires (25) are butted against the sheath core wires (3) is set to be a reference position 0. When a position rearward (on the side toward the sheath core wires) of the reference position 0 is irradiated with the laser beam, this position is on a negative (−) side. When a position frontward (on the side toward the electrode wires) of the reference position 0 is irradiated with the laser beam, this position is on a positive (+) side. Different positions (different target welding positions) were irradiated with the laser beam. Ten test members were produced for each of Samples Nos. 4 to 10 with different target welding positions.

The conditions of the laser welding were the same as those in the first embodiment except for the target welding position. Specifically, the conditions of the laser welding were the same as the conditions exemplified in the first embodiment. While the rear end surfaces of the electrode wires were butted against the forward end surfaces of the sheath core wires, a load of 42.0 gf (corresponding to an applied force of 412.02 mN) was applied to the contact portion from opposite axial ends.

Figure 16:
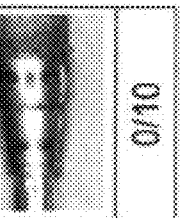
FIG. 16 contains photographs showing, on a magnified scale, the vicinities of weld portions between the electrode wires and the sheath core wires of Samples Nos. 4 to 10 in Experimental Example 2.

The results are shown in FIG. 16. As is clear from FIG. 16, when the target welding position was negative (i.e., on the side toward the sheath core wires), particularly when the target welding position was located at −0.05 mm to −0.25 mm as in Samples Nos. 6 to 10, good weld portions (i.e., weld portions satisfying all the conditions 1 to 4) were obtained.

However, when the target welding position was +0.2 mm to +0.10 mm as in samples Nos. 4 and 5, the weld portions were significantly narrowed (i.e., one or more of conditions 1 to 4 were not satisfied). Therefore, a target welding position of +0.2 mm to +0.10 mm is not preferred. In FIG. 16, the number of specimens with significantly narrowed weld portions out of the ten specimens is shown as the number of narrowed NG samples.

4-3. Experimental Example 3

In Experimental Example 3, the tensile strength of conductive wires of temperature sensors was examined, each conductive wire including a weld portion.

Many conductive wire specimens (e.g., 30 specimens) with narrowed and non-narrowed weld portions were produced using different target welding positions, as in Experimental Example 2.

The tensile strength of each specimen was determined as follows. The electrode wires and the sheath core wires were held and pulled in their axial direction at a constant speed, and the tensile strength when the conductive wires broke was determined. In addition, the cross-sectional areas of the narrowed weld portions of each specimen (the areas of the cross sections perpendicular to the axial direction) were determined.

Figures 17, 18:
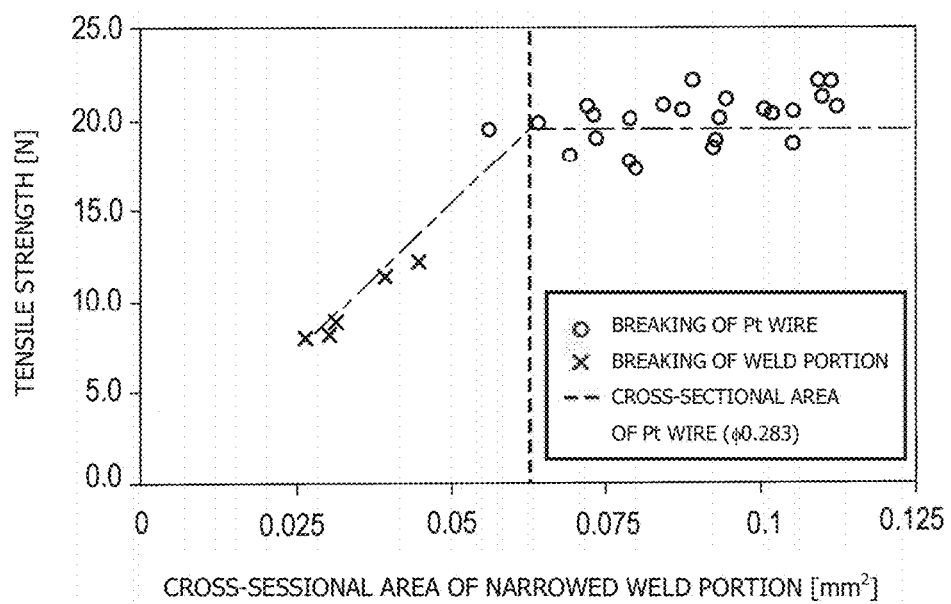
FIG. 17 is a graph showing the relationship between the cross-sectional area of a narrowed weld portion and tensile strength in Experimental Example 3.
FIG. 18 is an illustration of a forward end portion of a conventional temperature sensor cut in its axial direction.

The results are shown in FIG. 17. In FIG. 17, circles (o) represent that breakage occurred in an electrode wire (Pt wire), and crosses (x) represent that breakage occurred in a weld portion. The diameter of the electrode wires was ϕ0.283 mm.

As is clear from FIG. 17, the larger the cross-sectional area of the narrowed weld portion (the area of the cross-session of the narrowed weld portion), the larger the tensile strength. When the cross-sectional area of the narrowed weld portion is the same as the cross-sectional area of the electrode wire, the electrode wire breaks.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

For example, the materials and diameters of the electrode wires and sheath core wires are not limited to those in the above-described embodiments. Moreover, the temperature sensitive element is not limited to those in the above-described embodiments.

This application is based on Japanese Patent Application No. 2016-020950 filed Feb. 5, 2016, incorporated herein by reference in its entirety.

What is claimed is:

1. A temperature sensor comprising:
a temperature sensitive element including a temperature-sensitive portion disposed at a forward end portion, with respect to an axial direction, of the temperature sensitive element and a pair of electrode wires extending rearward from the temperature-sensitive portion, the temperature-sensitive portion having an electric characteristic that changes with temperature; and
a pair of signal wires which are connected to rear end portions of the pair of electrode wires and to which an electric signal from the temperature sensitive element is transmitted,
wherein each of the electrode wires and a corresponding one of the signal wires to which the electric signal is transmitted are disposed such that an axial line of each of the electrode wires is aligned with an axial line of the corresponding one of the signal wires, and a rear end portion, with respect the axial direction, of each of the electrode wires and a forward end portion, with respect the axial direction, of the corresponding one of the signal wires face each other and are joined together,
wherein the electrode wires are made of a material different from a material of the signal wires, and the electrode wires are smaller in diameter than the signal wires,
wherein the temperature sensor further comprises weld portions each disposed between the rear end portion of one of the electrode wires and the forward end portion of a corresponding one of the signal wires, and the weld portions are formed by melting and mixing the material of the electrode wires and the material of the signal wires to thereby join the electrode wires and the signal wires together,
wherein, when the temperature sensor is viewed in a direction perpendicular to a plane in which the pair of electrode wires are disposed,
a forward end interface is present between a forward end portion of each of the weld portions and the rear end portion of a corresponding one of the electrode wires,
a rear end interface is present between a rear end portion of the each of the weld portions and the forward end portion of a corresponding one of the signal wires,
each of the weld portions has a first radially outermost circumferential portion located on one side in a radial direction thereof and a second radially outermost circumferential portion located on the other side in the radial direction, the first radially outermost circumferential portion being located radially outward of a first straight line connecting a first end of the forward end interface of the each of the weld portions and a first end of the rear end interface of the each of the weld portions, the second radially outermost circumferential portion being located radially outward of a second straight line connecting a second end of the forward end interface of the each of the weld portions and a second end of the rear end interface of the each of the weld portions, and
in each of the weld portions, a forward end-side length, in the axial direction, from most radially outwardly protruding portions of the first and second radially outermost circumferential portions to the forward end interface is larger than a rear end-side length, in the axial direction, from the most radially outwardly protruding portions to the rear end interface.

2. The temperature sensor as claimed in claim 1, wherein the entire first and second radially outermost circumferential portions of each of the weld portions are curved so as to be convex radially outward.

3. The temperature sensor as claimed in claim 1, wherein, when the temperature sensor is viewed in the axial direction, the rear end portion of each of the electrode wires is included within the forward end portion of a corresponding one of the signal wires.

4. A method for manufacturing the temperature sensor as claimed in claim 1,
the method comprising: butting the forward end surfaces of the signal wires and the rear end surfaces of the respective electrode wires against each other; and welding the signal wires and the respective electrode wires together.

5. The method for manufacturing the temperature sensor as claimed in claim 4, which comprises irradiating the signal wires with a laser beam to thereby laser-weld the signal wires and the respective electrode wires together.

6. The method for manufacturing the temperature sensor as claimed in claim 5, wherein a material constituting the signal wires has a lower melting point than a material of the electrode wires, and
the method comprises irradiating the signal wires having the lower melting point with a laser beam to thereby laser-weld the signal wires and the respective electrode wires together.

7. The method for manufacturing the temperature sensor as claimed in claim 6, which comprises welding the signal wires and the respective electrode wires together while applying a load in a direction in which the signal wires and the respective electrode wires are butted against each other.

8. The method for manufacturing the temperature sensor as claimed in claim 5, which comprises welding the signal wires and the respective electrode wires together while applying a load in a direction in which the signal wires and the respective electrode wires are butted against each other.

9. The method for manufacturing the temperature sensor as claimed in claim 4, wherein a material constituting the signal wires has a lower melting point than a material of the electrode wires, and
the method comprises irradiating the signal wires having the lower melting point with a laser beam to thereby laser-weld the signal wires and the respective electrode wires together.

10. The method for manufacturing the temperature sensor as claimed in claim 9, which comprises welding the signal wires and the respective electrode wires together while applying a load in a direction in which the signal wires and the respective electrode wires are butted against each other.

11. The method for manufacturing the temperature sensor as claimed in claim 4, which comprises welding the signal wires and the respective electrode wires together while applying a load in a direction in which the signal wires and the respective electrode wires are butted against each other.

* * * * *